(12) United States Patent
Schulz et al.

(10) Patent No.: US 7,147,202 B2
(45) Date of Patent: Dec. 12, 2006

(54) TANK VENT VALVE

(75) Inventors: Wolfgang Schulz, Bietigheim-Bissingen (DE); Achim Meisiek, Rudersberg (DE)

(73) Assignee: Robert Bosch GmbH, Stuttgart (DE)

( * ) Notice: Subject to any disclaimer, the term of this patent is extended or adjusted under 35 U.S.C. 154(b) by 40 days.

(21) Appl. No.: 10/522,310

(22) PCT Filed: Apr. 6, 2004

(86) PCT No.: PCT/DE2004/000711

§ 371 (c)(1),
(2), (4) Date: Jan. 24, 2005

(87) PCT Pub. No.: WO2004/109089

PCT Pub. Date: Dec. 16, 2004

(65) Prior Publication Data

US 2005/0269539 A1    Dec. 8, 2005

(30) Foreign Application Priority Data

Jun. 5, 2003    (DE)    ................. 103 25 379

(51) Int. Cl.
  *F16K 31/00*    (2006.01)
(52) U.S. Cl. .................. 251/64; 251/129.16; 251/368; 335/279
(58) Field of Classification Search .............. 251/64, 251/129.16, 368; 335/279
See application file for complete search history.

(56) References Cited

U.S. PATENT DOCUMENTS

| | | | |
|---|---|---|---|
| 5,232,196 A | 8/1993 | Hitchings et al. | |
| 5,529,841 A * | 6/1996 | Neihof | 428/328 |
| 5,579,741 A | 12/1996 | Cook et al. | |
| 5,718,264 A * | 2/1998 | Sturman | 137/625.65 |
| 5,775,670 A | 7/1998 | Osterbrink | |
| 6,415,817 B1 | 7/2002 | Krimmer et al. | |
| 6,935,612 B1* | 8/2005 | McCombs et al. | 251/129.15 |
| 2002/0088496 A1 | 7/2002 | Kondo | |
| 2003/0056771 A1 | 3/2003 | Veinotte et al. | |
| 2003/0102446 A1 | 6/2003 | Krimmer et al. | |

FOREIGN PATENT DOCUMENTS

| | | |
|---|---|---|
| DE | 199 01 090 A1 | 7/2000 |
| DE | 101 12 661 A1 | 9/2002 |
| FR | 2 761 447 | 10/1998 |

* cited by examiner

*Primary Examiner*—Edward K. Look
*Assistant Examiner*—John K. Fristoe, Jr.
(74) *Attorney, Agent, or Firm*—Michael J. Striker

(57) ABSTRACT

A canister-purge valve for the metered admixing of a fuel scavenged from a fuel tank of an internal combustion engine into the internal combustion engine includes a valve seat and a valve body movably located relative to the valve seat. A sealing element is provided on the side of the valve body facing the valve seat and a damping element is provided on the side of the valve body facing away from the valve seat. The sealing element (40) is made of a first elastomer and the damping element (41) is made of a second elastomer with different properties than the first elastomer.

7 Claims, 1 Drawing Sheet

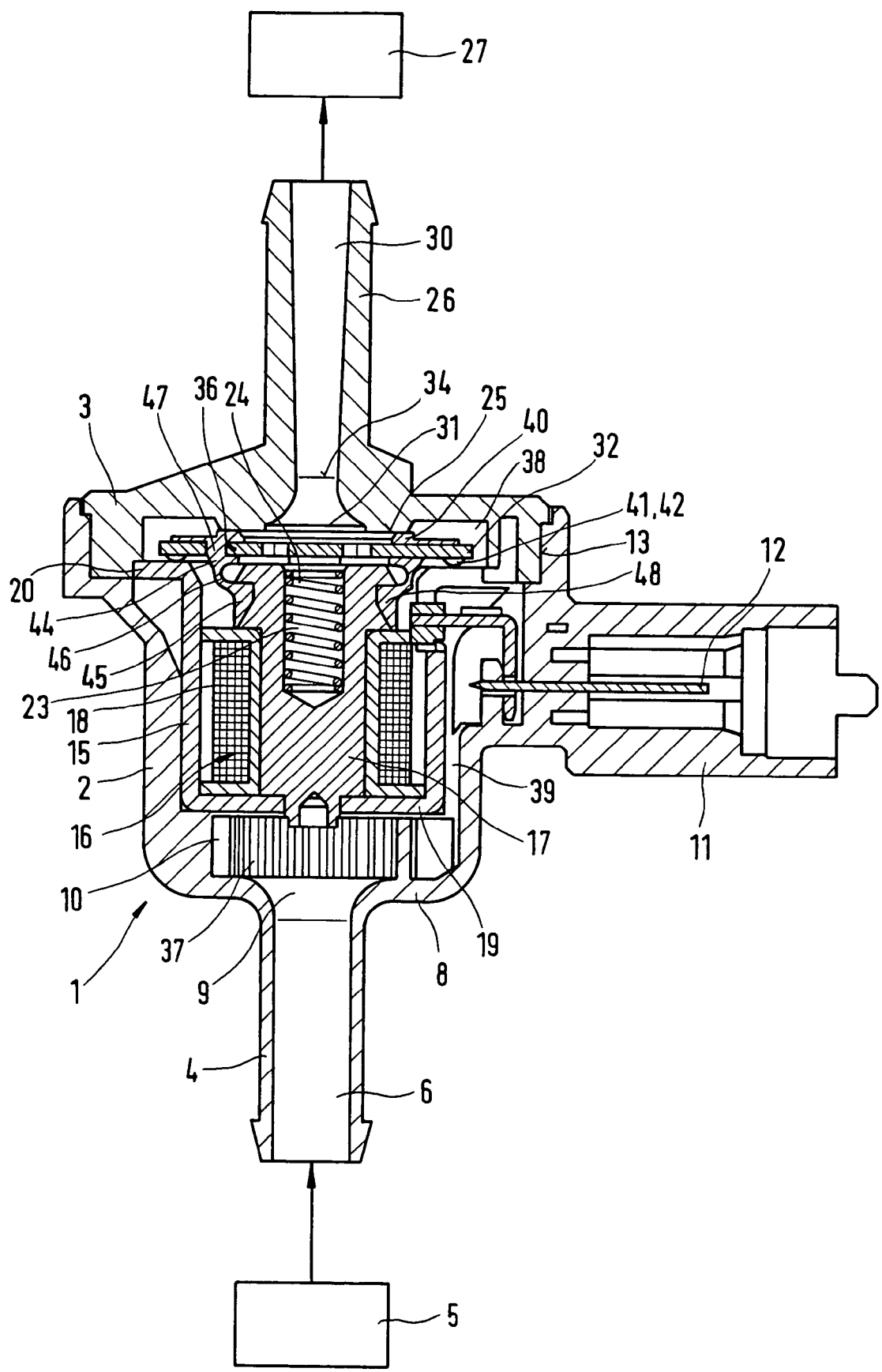

TANK VENT VALVE

CROSS-REFERENCE

The invention described and claimed hereinbelow is also described in PCT/DE 2004/000711, filed Apr. 6, 2004 and DE 103 25 379.3, filed Jun. 5, 2003. This German Patent Application, whose subject matter is incorporated here by reference, provides the basis for a claim of priority of invention under 35 U.S.C. 119 (a)–(d).

BACKGROUND OF THE INVENTION

The present invention is based on a canister-purge valve.

A canister-purge valve is already known from DE 199 01 090 A1 that includes a valve seat and a valve body with a sealing element and a damping element, the valve body being movably located relative to the valve seat. The sealing element is located on a side of the valve body facing the valve seat, and the damping element is located on a side of the valve body facing away from the valve seat. The sealing element and the damping element are integrally extruded as a single component on the valve body using injection molding, and are made of a single elastomer composed of a mixture of fluorosilicone and silicone. In selecting the elastomer, a compromise must be struck between good sealing properties and good damping properties.

SUMMARY OF THE INVENTION

In contrast, the canister-purge valve according to the present invention has the advantage that improved performance of the canister-purge valve is attained in a simple manner by the fact that the sealing element is made of a first elastomer and the damping element is made of a second elastomer. In this manner, it is possible to attain very good sealing properties for the sealing element and very good damping properties for the damping element.

It is particularly advantageous when the first elastomer and the second elastomer are composed of a fluorosilicone and a silicone, since this is a particularly suitable mixture of materials.

It is furthermore advantageous when the second elastomer contains more fluorosilicone than the first elastomer, since this makes the second elastomer less sensitive to fuel.

In an advantageous embodiment, a fluorosilicone-silicone ratio of the first elastomer is one to one. Very good properties in terms of low wear are attainable with this mixing ratio.

In a further advantageous embodiment, the fluorosilicone-silicone ratio of the second elastomer is nine to one. Very good properties can be obtained with this mixing ratio with regard for minimal swelling in the case of intensive contact with fuel.

It is furthermore advantageous when the first elastomer and the second elastomer have different Shore hardnesses, since this enables the sealing properties of the sealing element and the damping properties of the damping element to be optimized.

In addition, it is advantageous to integrally extrude the sealing element and the diaphragm element to the valve body using injection molding, since this enables the valve body to be manufactured in a particularly favorable manner.

It is also advantageous when a diaphragm element is located on the side of the metallic main body on the side facing away from the valve seat, the diaphragm element movably supporting the valve body between the valve seat and an abutment, since an economical and reliable support of the valve body is attainable in this manner.

BRIEF DESCRIPTION OF THE DRAWINGS

An exemplary embodiment of the present invention is shown in a simplified form in the drawing and is explained in greater detail in the description below.

DETAILED DESCRIPTION OF THE EXEMPLARY EMBODIMENT

The drawing shows a canister-purge valve according to the present invention for the metered admixing of a fuel scavenged from a fuel tank of an internal combustion engine into the internal combustion engine.

A canister-purge valve is known from DE 101 12 661 A1, for example, whereby its contents are expressly intended to be part of the disclosure of this application.

The canister-purge valve is connected on the inlet side to an activated charcoal filter, for example, and, on the outlet side, it is connected at least directly to an intake manifold or a cylinder of an internal combustion engine. By opening the canister-purge valve and utilizing a vacuum in the intake manifold of the internal combustion engine, fresh air can be drawn in from the atmosphere through the activated charcoal filter, whereby the activated charcoal filter releases fuel scavenged from a fuel tank to the fresh air, and the scavenged fuel enters the intake manifold together with the fresh air and is therefore supplied to the internal combustion engine. A control unit controls the amount of admixed fuel via an opening time of the canister-purge valve. The canister-purge valve can be controlled in a pulsed manner by alternately opening and closing it.

The canister-purge valve is composed, e.g., of a two-part valve housing 1 with a first housing part 2, which is configured in the shape of a pot, for instance, and with a second housing part 3 that is configured in the shape of a cover, for example. First housing part 2 has an inlet connection 4 for the at least direct connection with a reservoir 5 for the scavenged fuel, the reservoir being filled with activated charcoal, for example. Inlet connection 4 includes an inlet passage 6 that, in the region of a housing base 8 of pot-shaped, first housing part 2, leads via an opening 9 into a housing inner space 10 of valve housing 1 bordered by first housing part 2 and second housing part 3. Inlet passage 6 is connected at least directly with reservoir 5 on an end facing away from opening 9. First housing part 2 includes, e.g., on its circumference, a plug 11 which is integrally connected with first housing part 2, the plug including electrical connection elements 12 for connection with external plug contacts. Second housing part 3 is centrally located in a housing recess 13 of first housing part 2, for example.

A pot-shaped pot magnet 15, for example, is located in housing inner space 10 of pot-shaped, first housing part 2, in which said pot magnet an actuator, e.g., an electromagnet 16, is provided. Pot-shaped pot magnet 15 has a pot base that, in first housing part 2, faces housing base 8, and, on the end face diametrically opposed to pot base 19, has a pot collar 20 which points radially outwardly.

Electromagnet 16 includes an excitation winding 18 located around a magnet core 17 in an annular shape. Magnet core 17 extends over excitation winding 18 in its longitudinal extension toward pot collar 20. On the end face facing pot collar 20, magnet core 17 includes a recess 23, for example, in which a spring element, e.g., a helical compression spring 24, is located.

A valve seat 25 is formed on the side of second housing part 3 facing housing base 8 of first housing part 2.

An outlet connection 26 for the at least direct connection with an intake manifold 27 of an internal combustion engine is provided on second housing part 3. Outlet connection 26 has an outlet passage 30, which leads via a valve opening 31 located on valve seat 25 into housing inner space 10, and is connected at least directly with intake manifold 27 on an end facing away from valve opening 31. Valve seat 25 is provided around valve opening 31 in an annular shape, for example.

Valve seat 25 of second housing part 3 is located at a distance from pot collar 20 of pot magnet 15. A valve body 31 is provided between valve seat 25 and pot collar 20 such that it is movable in the axial direction. Pot collar 20 functions as a stop to limit the stroke motion of valve body 32. Valve body 32 covers valve opening 31 when it bears against valve seat 25, thereby sealing valve opening 31. When valve body 32 lifts away from valve seat 25, valve opening 31 is opened.

Valve housing 1 has a valve axis 33, for example. Inlet connection 4 with inlet passage 6, outlet connection 26 with outlet passage 30, first housing part 2, second housing part 3, pot magnet 15 with magnet core 17 and excitation winding 18 and valve body 32 are located, e.g., concentrically with valve axis 33.

Outlet passage 30 is configured as a nozzle, for example; it constricts from valve opening 31 in the direction of flow to a narrowest passage cross section 34 and then expands toward the end facing away from valve opening 31.

Housing base 8 and pot base 19 of pot magnet 15 are located at a distance from each other, so that a hollow valve inlet space 37 is formed in housing inner space 10. Valve inlet space 37 can contain a filter for separating out dirt particles. Housing inner space 10 between valve seat 25 and pot collar 20 is referred to as valve space 38. Valve inlet space 37 and valve space 38 are connected with each other via at least one side passage 39. Side passage 39 is formed, at least in sections, by a gap between pot-shaped pot magnet 15 and first housing part 2, for example.

Valve body 32 is composed of a metallic main body 36, which is configured in the shape of a disk and is made of a magnetizable metal. At least one pressure equalization opening 35 extending in the direction of magnet core 17 is provided on the metallic main body 36 in the region of valve opening 31. As a result, the pressure of intake manifold 27 acting via outlet passage 30 acts on a partial surface facing valve seat 25 and a partial surface of metallic main body 36 facing away from the valve seat, so that electromagnet 16, when opening the canister-purge valve, need only overcome the force of compression spring 24 and not also a suction force acting in the direction of valve seat 25, for example. An elastic sealing element 40 is provided on metallic main body 36 of valve body 32 in the region of valve seat 25 on the side facing valve seat 25. When the canister-purge valve is closed, sealing element 40 seals valve seat 25 around valve opening 31 in an annular manner, so that vapor can not flow out of reservoir 5 through valve opening 31 of the canister-purge valve into intake manifold 27.

In the region of pot collar 20, main body 36 of valve body 32 includes an elastic damping element 41 on the side facing away from valve seat 25. Damping element 41 damps the impact of main body 36 on pot collar 20 when the canister-purge valve is opened, so disturbing noises are not produced. Damping element 41 includes, e.g., knob-like raised areas 42 extending in the direction of pot collar 20, the raised areas touching pot collar 20 before main body 32 does, when main body 32 approaches pot collar 20.

An elastic diaphragm element 44 is located on main body 36 of valve body 32 in the region of magnet core 17 on the side facing away from valve seat 25, the diaphragm element extending away from main body 36 in the direction of pot base 19 and gripping around magnet core 17 at least in sections, in an annular manner, and being located with a ridge-shaped enlargement 48 in a further recess 45 of magnet core 17. Further recess 45 is provided as a groove encircling magnet core 17 in an annular shape. Main body 36 of valve body 32 includes through holes 47 which, e.g., integrally connect sealing element 40 with diaphragm element 44.

Between enlargement 48 and the side of main body 36 facing away from valve seat 25, diaphragm element 44 includes a diaphragm fold 46, for example, which permits valve body 32 to move between valve seat 25 and pot collar 20. Valve body 32 is movably supported on magnet core 17 by membrane element 44.

Sealing element 40, damping element 41 and membrane element 44 are located on main body 36 of valve body 32, for example, and are integrally connected with each other, for example.

Canister-purge valve is closed when de-energized, since compression spring 24 presses valve body 32 with sealing element 40 against valve seat 25. When excitation winding 18 of electromagnet is energized, a magnetic field is produced in pot magnet 15, which lifts valve body 32 away from valve seat 25 and pulls it in the direction of pot collar 20. As a result of this lifting motion induced by the magnetic field, valve opening 31 and, therefore, the canister-purge valve, is opened, so that vapor can flow out of reservoir 5 thorough inlet passage 6, valve inlet space 37, side passage 39, valve space 38, valve opening 31 and outlet passage 30 in the direction of intake manifold 27. The lift of valve body 32 is 0.6 millimeter, for instance. The volumetric flow of vapor flowing through canister-purge valve is metered by opening and closing the canister-purge valve in a pulsed manner, for example.

In general, elastomers tend to increase in volume after intensive or long contact with fuel.

To ensure that the lifting motion of valve body 32 and, therefore, the functionality of the canister-purge valve is not impaired under extreme conditions, a material with good properties in terms of swelling is used for damping element 41.

According to the present invention, sealing element 40 is made of a first elastomer and damping element 41 is made of a second elastomer, whereby the first elastomer has sufficient properties and the second elastomer has very good properties in terms of low tendency to swell. Diaphragm element 44 is made of the first elastomer, for example.

The first elastomer and/or the second elastomer is composed of a mixture of a fluorosilicone and a silicone, for example, whereby the second elastomer of damping element 41 has a higher proportion of fluorosilicone than the first elastomer of sealing element 40. The first elastomer and/or the second elastomer can also be composed of Viton or another suitable elastomer. The first elastomer can be composed of a mixture of a fluorosilicone and a silicone, and the second elastomer can be composed of Viton.

The ratio of fluorosilicone to silicone in the first elastomer is one to one, for example. With this configuration, sealing element 40 has good properties in terms of strength, buckling behavior and low wear. Minimal swelling of sealing element 40 in the presence of very high fuel concentration in the vapor flowing through the canister-purge valve does not affect the functionality of the canister-purge valve.

The ratio of fluorosilicone to silicone in the second elastomer is nine to one, for example. With this configuration, damping element 41 has very good properties in terms of low swelling in the presence of high fuel concentration in the volumetric flow of the canister-purge valve.

The ratio of fluorosilicone to silicone can also be less than or greater than nine to one, however, as long as the second elastomer of damping element 41 has more fluorosilicone than the first elastomer of sealing element 40.

Due to the fact that an elastomer is provided for sealing element 40 and damping element 41, the first elastomer can also be configured in an optimal manner in terms of very good sealing properties, and the second elastomer can also be configured in an optimal manner in terms of very good damping properties.

The first elastomer and the second elastomer can have different Shore hardnesses, for example, to further optimize the sealing properties of the sealing element and the damping properties of the damping element.

Sealing element 40, damping element 41 and the diaphragm element are integrally extruded onto main body 36 using a known two-component injection-molding procedure in one method step, for example.

What is claimed is:

1. A canister-purge valve for the metered admixing of a fuel scavenged from a fuel tank of an internal combustion engine into the internal combustion engine, with a valve seat and a valve body movably located relative to the valve seat, whereby a sealing element is provided on the side of the valve body facing the valve seat and a damping element is provided on the side of the valve body facing away from the valve seat, wherein the sealing element (40) is made of a first elastomer and the damping element (41) is made of a second elastomer with different properties than the first elastomer, wherein the first elastomer and/or the second elastomer are composed of a fluorosilicone and a silicone, wherein the second elastomer includes a higher proportion of fluorosilicone than the first elastomer, and wherein the sealing element (40) and the damping element (41) are integrally extruded on the metallic main body (36) of the valve body (32) using injection molding.

2. The canister-purge valve as recited in claim 1, wherein a ratio of fluorosilicone to silicone in the first elastomer is one to one.

3. The canister-purge valve as recited in claim 1, wherein a ratio of fluorosilicone to silicone in the second elastomer is nine to one.

4. The canister-purge valve as recited in claim 1, wherein the first elastomer and the second elastomer have different Shore hardnesses.

5. The canister-purge valve as recited in claim 4, wherein a diaphragm element (44) is located on the side of the metallic main body (36) facing away from the valve seat (25), the diaphragm element movably supporting the valve body (32) between the valve seat (25) and a stop (20).

6. The canister-purge valve as recited in claim 1, wherein the valve body (32) includes a metallic main body (36) on which the sealing element (40) and the damping element (41) are located.

7. The canister-purge valve as recited in claim 1, wherein the injection molding is performed using a 2-component injection-molding method.

* * * * *